Aug. 9, 1927.
G. A. SEXTON
1,638,415
TEST MEASURE
Filed Nov. 26, 1926
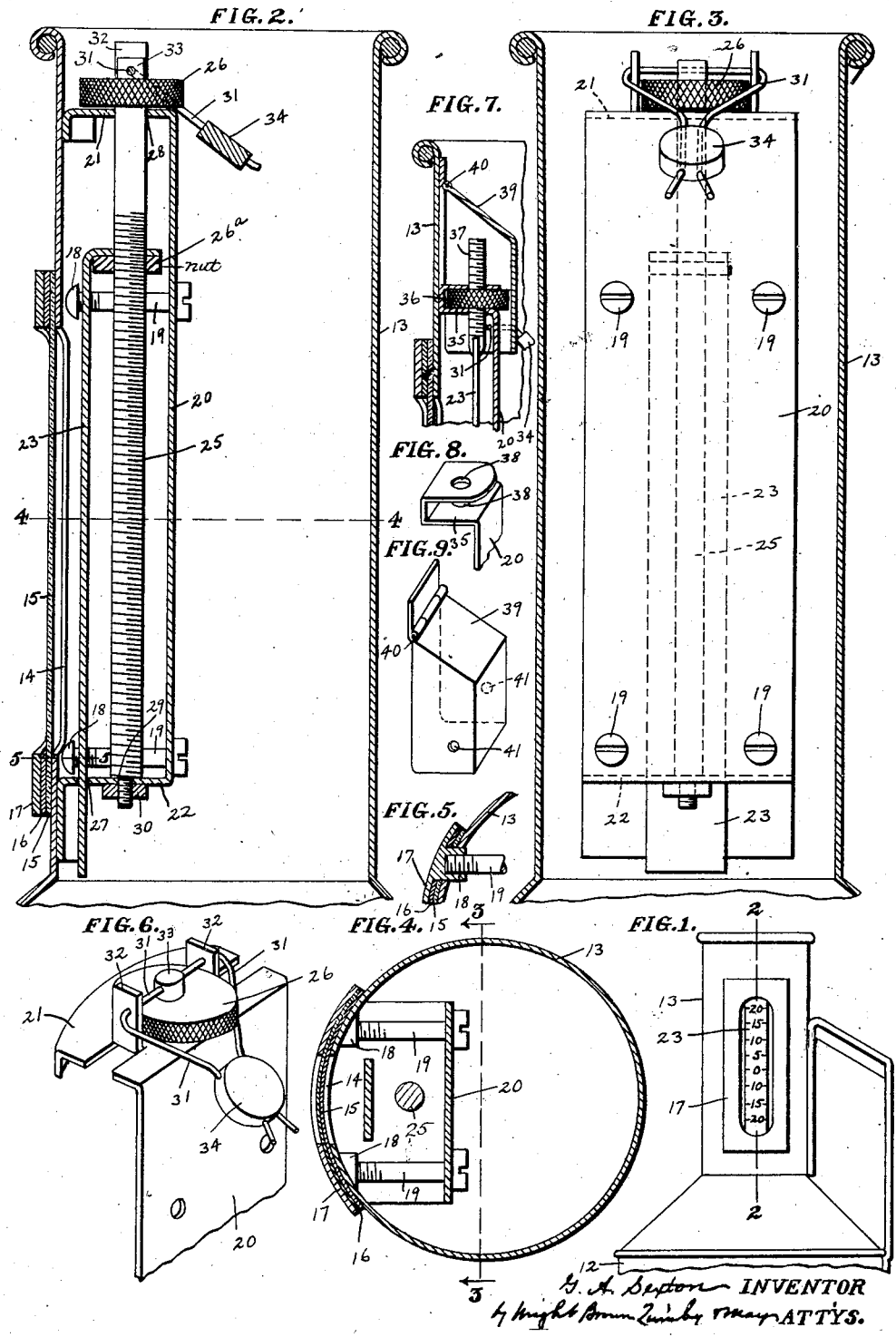

Patented Aug. 9, 1927.

1,638,415

UNITED STATES PATENT OFFICE.

GEORGE A. SEXTON, OF WINCHESTER, MASSACHUSETTS.

TEST MEASURE.

Application filed November 26, 1926. Serial No. 150,831.

This invention relates to a test measure adapted for use by an official sealer in testing the accuracy of gasoline pumps used at filling stations.

The measure usually includes a body portion and a neck portion, the capacity of said portions being such that when the sealer pours a charge of, say, five gallons, which has been previously measured, or is known to have an exact predetermined quantity, into the measure, the surface of the charge will stand within the neck. A vertically elongated liquid-tight sight-opening is provided in the neck through which the surface of the charge is visible, and a gage associated with the neck is vertically adjustable by the sealer, so that when the measure is known to contain, say, exactly five gallons, the gage may be adjusted to indicate that fact by registering the quantity. The measure is provided with means whereby the sealer, after adjusting the gage, may prevent a subsequent unauthorized adjustment thereof, and thus cause the measure to remain standardized, unless it becomes dented or otherwise deformed, so that its capacity is changed, and another adjustment of the gage is required.

The invention is embodied in certain improvements in the construction and mode of operation of the gage, and in the means for providing the neck with a liquid-tight sight-opening.

Of the accompanying drawings forming a part of this specification,—

Figure 1 is a side elevation, on a reduced scale, showing the neck and a portion of the body of a test measure embodying the invention.

Figure 2 is a section on line 2—2 of Figure 1.

Figure 3 is a section on line 3—3 of Figure 4, and shows in elevation parts at the left of said line.

Figure 4 is a section on line 4—4 of Figure 2.

Figure 5 is a fragmentary section on line 5—5 of Figure 2.

Figure 6 is a fragmentary perspective view, showing a portion of the holder, a portion of the adjusting screw, and the lead seal hereinafter described.

Figure 7 is a fragmentary sectional view, showing a modification.

Figures 8 and 9 show in perspective parts shown by Figure 7.

The same reference characters indicate the same parts in all of the figures.

In the drawings, and referring first, to Figures 1 to 6, inclusive, 12 designates the body, and 13 the neck of a test measure adapted for use by an official sealer.

The neck is provided with a vertically elongated sight-opening which is preferably constructed by forming a slot 14 (Figures 2 and 4) in the neck, seating the marginal portion of a transparent pane 15, which may be of celluloid, on the external surface portion of the neck, surrounding the slot, seating a packing gasket 16, on the outer surface of the pane, and seating a marginal frame 17, on the gasket. The frame is provided with tapped studs 18, projecting through connecting orifices in the gasket, pane and neck, and engaged by headed clamping screws 19, as best shown by Figure 5. The heads of the screws bear on the body 20 of a guiding holder which, in the preferred embodiment of the invention, includes an upper arm 21, and a lower arm 22, said arms being bent from the body 20, and seated on the internal surface of the neck. The screws 19 in this instance, act to hold the frame 17 clamped on the gasket and the pane, and to press the arms 21 and 22 on the neck. The pane, the gasket, and the frame secured to the neck, constitute a suitable liquid-tight closure for the sight-opening.

The holder constitutes an element of a registering structure within the neck, and said structure includes a gage 23, guided in a vertical path by the holder and spaced by the latter from the sight-opening, so that a portion of the surface of a charge of liquid in the measure is visible between the gage and the sight-opening. The registering structure includes also manually operable adjusting means, adjustably supporting the gage on the holder, and operable at the mouth of the neck to vary the height of the gage.

The gage is graduated, as shown by Figure 1, and may be adjusted after a predetermined testing charge of say, five gallons, is poured into the measure, to cause the zero mark to stand at the surface of the charge, and thus register the quantity. When the gage is properly adjusted, the measure is standardized, means being provided, as hereinafter described, for preventing subsequent unauthorized adjustment of the gage.

The manually operable adjusting means preferably includes a vertical adjusting screw 25, adapted to be rotated in the holder and confined against vertical movement therein. Said screw has a knurled operating head 26, above the upper ear 21, whereby it may be manually rotated. The gage 23 is provided with a nut 26ª, engaged with the screw, so that rotation of the screw vertically, adjusts the gage. The lower end of the gage is slidable in a slot 27 (Figure 2) in the lower arm 22 of the holder, so that the gage is prevented from turning with the screw. The upper end of the screw is preferably journaled in a bearing 28 (Figure 2) in the upper arm 21, and its lower end is journaled in a bearing 29 in the lower arm 22. The head 26 bears on the upper arm, and a suitable stop 30, on the lower end of the screw, bears on the lower arm, so that the screw is prevented from moving endwise.

After the desired adjustment of the gage has been effected, the operator may prevent unauthorized adjustment by passing the wire member 31 of an ordinary lead seal through coinciding orifices in upstanding fingers 32, on the upper ear 21, and in a stud 33, constituting the upper end of the screw, as best shown by Figure 6, the ends of the wire member being passed through a lead disk 34, which may be impressed by an official seal, and thus fixed to the wire member, so that it cannot be removed without deformation.

Figures 7, 8 and 9 show a modification in which the body 20 of the guiding holder is provided with an upper ear 35, which is angular, so that it forms a space between two parallel ear portions. The ear 35 is soldered to the neck, and the lower ear, not shown, may be formed like the lower ear 22, and also soldered to the neck. In this instance, the manually operable adjusting means is embodied in a peripherally knurled nut 36, inserted between the parallel portions of the ear 35, and a screw 37, fixed to the gage 23, and engaged with the nut, the screw passing through orifices 38 (Figure 8) in the angular ear.

The means for preventing unauthorized adjustment of the gage is embodied in a hood 39, connected by a hinge 40, with the neck, and adapted, when turned downward as shown, to prevent access to the nut 36. The hood is provided with orifices 41 (Figure 9) through which the wire member 31 of the seal may be passed. Said member is passed behind the body 20 of the fixed guiding holder, and its ends are passed through the lead disk 34 at points outside the hood, so that the hood cannot be swung upward to permit access to the nut 36, until the seal is broken.

In each embodiment of the invention, the gage and the means for adjusting it, are located within the neck, the gage being out of contact with the neck, and the adjusting means being operable by a thumb and finger inserted in the mouth of the neck. The gage may, therefore, be conveniently adjusted, and endwise movements of any desired amplitude may be imparted thereto, the gage being entirely independent of the sight-opening.

I claim:

1. A test measure including a neck having a vertically elongated sight opening through which the surface of a charge of liquid in the measure is visible, a liquid-tight closure for said opening including a transparent pane covering the opening, and sealing means securing a marginal portion of the pane to the neck, and a registering structure within the neck, adapted to register the height of the charge, said structure including a guiding holder fixed to the neck, a gage guided in a vertical path by the holder and spaced by the latter from the sight opening, so that a portion of the surface of a charge of liquid in the measure is visible between the gage and the sight opening, and manually operable means adjustably supporting the gage on the holder and operable at the mouth of the neck to vary the height of the gage, means being provided for preventing unauthorized adjustment of the gage.

2. A test measure including a neck having a vertically elongated sight opening through which the surface of a charge of liquid in the measure is visible, a liquid-tight closure for said opening including a transparent pane covering the opening, and sealing means securing the marginal portion of the pane to the neck, a guiding holder fixed within the neck and including a vertical bar and upper and lower ears projecting from opposite ends of the bar and fixed to the neck, a vertical adjusting screw adapted to be rotated in the holder, and confined against vertical movement, said screw having an operating head above the upper ear, whereby it may be manually rotated, and a vertical gage interposed between the bar and the sight opening, and spaced from the latter, so that a portion of the surface of the charge is visible between the gage and the sight opening, the gage being provided with a nut engaged with the screw, so that rotation of the screw vertically, adjusts the gage, the lower end of the gage being slidable in a slot in the lower arm, so that the gage is prevented from turning with the screw, means being provided for preventing unauthorized rotation of the screw.

3. A test measure including a neck having a vertically elongated sight opening through which the surface of a charge of liquid in the measure is visible, a liquid-tight closure for said opening including a transparent pane covering the opening, and sealing means securing the marginal portion of the pane to the neck, a guiding holder fixed within the neck and including a vertical bar and upper and lower ears projecting from opposite ends of the bar, and fixed to the neck, a vertical adjusting screw adapted to be rotated in the holder, and confined against vertical movement, said screw having an operating head above the upper ear, whereby it may be manually rotated, and a vertical gage interposed between the bar and the sight opening, and spaced from the latter, so that a portion of the surface of the charge is visible between the gage and the sight opening, the gage being provided with a nut engaged with the screw, so that rotation of the screw vertically, adjusts the gage, the lower end of the gage being slidable in a slot in the lower arm, so that the gage is prevented from turning with the screw, the upper ear being provided with upstanding perforated fingers, and the upper end of the screw with a perforated projection between said fingers, the arrangement being such that the wire member of a lead seal may be inserted in the perforations, to prevent rotation of the screw.

4. A test measure including a neck having a vertically elongated sight opening through which the surface of a charge of liquid in the measure is visible, a liquid-tight closure for said opening including a transparent pane covering the opening, and sealing means securing the marginal portion of the pane to the neck, a transparent pane marginally seated on the neck around the margin of the opening, a packing gasket seated on the marginal portion of the pane, a clamping frame seated on the gasket and provided with tapped studs inserted in coinciding orifices in the gasket, pane, and neck, and projecting into the neck, a guiding holder including a vertical bar and upper and lower ears projecting from opposite ends of the bar and seated on the neck, headed clamping screws engaging the bar and the tapped studs and clamping the frame, gasket and pane against the neck, to provide a liquid-tight closure for the sight-opening, and a gage guided in a vertical path by the holder, and spaced by the latter from the sight-opening, means being provided for maintaining the gage in any position to which it may be adjusted.

In testimony whereof I have affixed my signature.

GEORGE A. SEXTON.